(12) United States Patent
Shoji

(10) Patent No.: US 7,898,231 B2
(45) Date of Patent: Mar. 1, 2011

(54) INTEGRATED CIRCUIT AND ELECTRONIC APPARATUS

(75) Inventor: Michiharu Shoji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 12/178,339

(22) Filed: Jul. 23, 2008

(65) Prior Publication Data

US 2009/0039859 A1 Feb. 12, 2009

(30) Foreign Application Priority Data

Aug. 8, 2007 (JP) ................................ 2007-207045

(51) Int. Cl.
*G05F 1/40* (2006.01)
(52) U.S. Cl. ........................ 323/282; 323/284; 345/212
(58) Field of Classification Search .................. 323/234, 323/282–286; 345/204, 211, 212
See application file for complete search history.

(56) References Cited

U.S. PATENT DOCUMENTS

| 6,082,265 | A  | * | 7/2000 | Sakamoto et al. | ............ 102/206 |
| 6,741,239 | B2 |   | 5/2004 | Iwasaki | |
| 6,850,047 | B2 | * | 2/2005 | Itabashi et al. | ................ 323/284 |
| 7,154,491 | B2 |   | 12/2006 | Iwasaki | |

FOREIGN PATENT DOCUMENTS

| JP | 2002-333872 A | 11/2002 |
| JP | 2006-020495 A | 1/2006 |

* cited by examiner

*Primary Examiner* — Jessica Han
(74) *Attorney, Agent, or Firm* — Canon U.S.A., Inc. I.P. Division

(57) ABSTRACT

An integrated circuit includes a trigger signal generating unit configured to generate a trigger signal for setting a control unit connected thereto in a reset state, an input unit configured to input a DC voltage of a predetermined voltage value, a pulse signal generating unit configured to generate and output a pulse signal with the predetermined voltage value to a power supply unit configured to generate a voltage to be supplied to the control unit with a coil and a capacitor, a detecting unit configured to detect generation of an event which requires an output of the trigger signal, a stopping unit configured to stop outputting of the pulse signal based on a detection result from the detecting unit, and an output unit configured to output the trigger signal generated by the trigger signal generating unit after outputting of the pulse signal is stopped and a predetermined condition is satisfied.

6 Claims, 8 Drawing Sheets

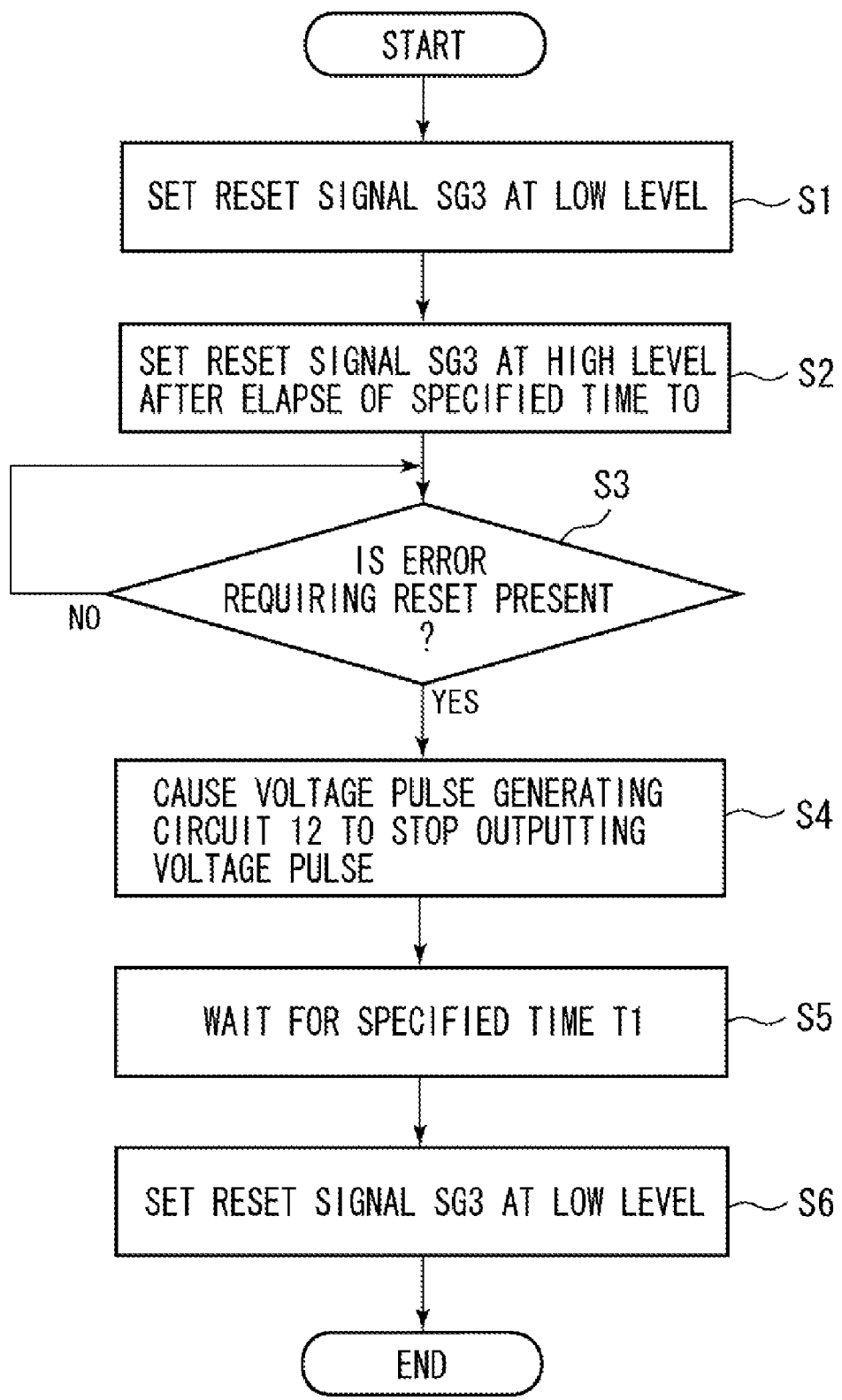

INTEGRATED CIRCUIT AND ELECTRONIC APPARATUS

BACKGROUND OF THE INVENTION

1. Field of the Invention

The present invention relates to an integrated circuit and an electronic apparatus.

2. Description of the Related Art

To deal with a recent trend toward multiple functions and cost reduction of electronic apparatuses, an integrated circuit (IC) including a motor drive circuit for driving a plurality of motors has been developed. An integrated circuit (IC) which has a partial function of a DC-DC converter circuit for supplying electric power to an application specific integrated circuit (ASIC) including a motor and a central processing unit (CPU) has also been discussed (Japanese Patent Application Laid-Open No. 2006-20495).

On the other hand, to increase an integration degree of control circuits such as the CPU and ASIC, circuit miniaturization is promoted. As the miniaturization proceeds, voltage supplied to the CPU and ASIC is being lowered. For example, the voltage supplied to the CPU and ASIC is reduced by 1.6 V.

Generally, power supply voltage accuracy is defined as a proportion and, as the voltage is lower, the absolute value of allowable voltage fluctuations becomes smaller. For example, 10% of 5 V is 500 mV, but 10% of 1 V is only 100 mV, which is 1/5 of 500 mV. Thus, higher voltage accuracy is required as a voltage level becomes lower.

FIGS. 8A and 8B illustrate an operation of a conventional integrated circuit. The conventional integrated circuit illustrated in FIG. 8A includes an integrated circuit 81 having a function of generating a voltage pulse signal, a smoothing circuit 82 and a logic circuit (control circuit) 83 of an electronic apparatus.

The integrated circuit 81 outputs a reset signal RS for resetting the logic circuit 83. The smoothing circuit 82 smoothes a pulse voltage output from the integrated circuit 81 and supplies the smoothed voltage V8 to the logic circuit 83.

The integrated circuit 81 and the smoothing circuit 82 constitute a switching type power supply circuit. The switching type power supply circuit has higher energy efficiency than a dropper type power supply circuit.

FIG. 8B illustrates a timing waveform of the reset signal RS and the voltage V8 in the circuit illustrated in FIG. 8A.

At a timing t0, power supply to the logic circuit 83 which is a power load of a power supply circuit is stopped and the reset signal RS is output. The logic circuit 83 receives the reset signal RS and goes into a reset state. Under the reset state, a load current drops. On the other hand, energy of an inductor provided in the smoothing circuit 82 increases the voltage V8 supplied to the logic circuit 83. A voltage level Vp3 to which the voltage V8 increases is generated. A peak voltage Vp3 may exceed the maximum rated voltage of the logic circuit 83 and damage the logic circuit 83. In FIGS. 8B, 0V is zero voltage level.

A technique for discharging remaining charges from an image display apparatus at the time of start and stop of power supply is discussed in Japanese Patent Application Laid-Open No. 2002-333872.

With such a configuration, miniaturization and cost reduction of electronic apparatuses cannot be achieved.

SUMMARY OF THE INVENTION

According to an aspect of the present invention, an integrated circuit includes a trigger signal generating unit configured to generate a trigger signal for setting a control unit connected thereto in a reset state, an input unit configured to input a DC voltage of a predetermined voltage value, a pulse signal generating unit configured to generate and output a pulse signal with the predetermined voltage value to a power supply unit configured to generate a voltage to be supplied to the control unit with a coil and a capacitor, a detecting unit configured to detect generation of an event which requires an output of the trigger signal, a stopping unit configured to stop outputting of the pulse signal based on a detection result from the detecting unit, and an output unit configured to output the trigger signal generated by the trigger signal generating unit after outputting of the pulse signal is stopped and a predetermined condition is satisfied.

According to another aspect of the present invention, an electronic apparatus includes a control circuit configured to control an operation of the electronic apparatus, a power supply circuit configured to output a voltage having a pulse signal smoothed with a coil and a capacitor to the control circuit, a pulse generating circuit configured to generate a pulse signal of a duty based on the voltage output by the power supply circuit, a trigger generating circuit configured to generates a trigger signal for setting the control circuit in a reset state, and a detecting circuit configured to detect generation of an event which requires an output of the trigger signal, wherein the pulse generating circuit stops outputting of the pulse signal based on detection by the detecting circuit, and then the trigger generating circuit waits to output the trigger signal until a predetermined condition is satisfied.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

FIG. 2 is a flowchart illustrating operations of the integrated circuit according to the first exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
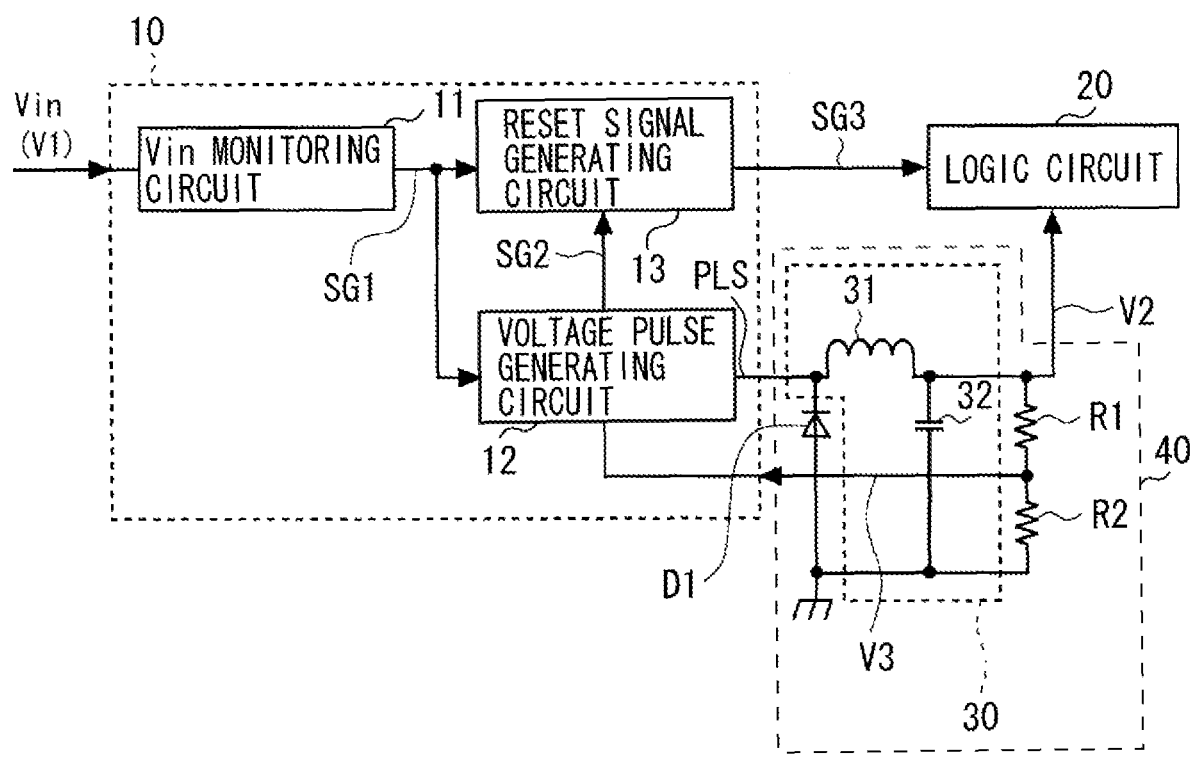
FIG. 1 illustrates an example configuration of integrated circuit according to a first exemplary embodiment of the present invention.

FIG. 1 illustrates an example circuit block diagram of an electronic apparatus (e.g. a recording apparatus) according to a first exemplary embodiment of the present invention. The electronic apparatus includes an integrated circuit 10, a power supply circuit 40 and a logic circuit 20.

The integrated circuit 10 receives an input voltage Vin (V1) of 18 V and outputs a voltage pulse PLS to the power supply circuit 40. The power supply circuit 40 includes a smoothing circuit 30, a diode D1 and resistors R1 and R2. The smoothing circuit 30 smoothes the voltage pulse PLS and supplies a voltage V2 of 5 V to the logic circuit 20. The smoothing circuit 30 includes an inductor 31 and a capacitor 32.

The voltage Vin is generated by an AC-DC converter (not illustrated).

The logic circuit 20 controls an operation of the recording apparatus and has, for example, a CPU and an ASIC. The integrated circuit 10 includes a Vin monitoring circuit 11, a voltage pulse generating circuit 12 and a reset signal generating circuit 13.

Next, the integrated circuit 10 is described. For simple description, some of the signal lines are not illustrated. The Vin monitoring circuit 11 monitors generation of an event in which a reset signal is set in a low state. For example, the Vin monitoring circuit 11 monitors whether a level of the voltage Vin input into the integrated circuit 10 is below a reference voltage. The voltage pulse generating circuit 12 also monitors generation of an event in which the reset signal is set in the low state. For example, the voltage pulse generating circuit 12 monitors whether a level of a voltage V3 obtained by dividing the voltage V2 is deviated from a predetermined voltage range.

The diode D1 is connected between an output of the voltage pulse generating circuit 12 and a ground (GND). The diode D1 is a Schottky barrier diode (SBD).

The voltage pulse generating circuit 12 generates a voltage pulse with a pulse width for converting the input voltage Vin into the voltage V2 lower than the input voltage Vin. The pulse width duty of the voltage pulse corresponds to the voltage V2. The voltage pulse generating circuit 12 includes a switch element (e.g. a metal-oxide semiconductor (MOS) transistor), a reference voltage generating circuit and a comparator circuit.

The voltage pulse generating circuit 12 turns on and off the switch element (switching) and outputs the voltage pulse PLS with a predetermined pulse width. The voltage pulse PLS is smoothed by passing through the smoothing circuit 30, and the voltage V2 is output. The voltage V3 obtained by dividing a voltage with the resistors R1 and R2 is supplied to the voltage pulse generating circuit 12.

The voltage pulse generating circuit 12 compares the voltage V3 with a reference voltage generated by the reference voltage generating circuit using the comparator circuit, and controls switching of the switch element based on a comparison result. This control allows the voltage V2 output by the power supply circuit 40 to be stabilized.

Upon detecting that the voltage Vin is equal to or less than the reference voltage, the Vin monitoring circuit 11 transmits a signal SG1 to the reset signal generating circuit 13 and the voltage pulse generating circuit 12. The reference voltage has a voltage value at which the operation of the integrated circuit 10 is assured. Upon reception of the signal SG1, the voltage pulse generating circuit 12 stops outputting of the voltage pulse PLS. After elapse of a specified time T1, the reset signal generating circuit 13 changes a level of a signal SG3 output to the logic circuit 20 from a high level to a low level.

Further, the voltage pulse generating circuit 12 monitors the level of the voltage V3 obtained by dividing the voltage V2. Upon detecting that the voltage V3 is deviated from the predetermined voltage range, the voltage pulse generating circuit 12 transmits a signal SG2 to the reset signal generating circuit 13. After elapse of the specified time T1, the reset signal generating circuit 13 changes the level of the signal SG3 output to the logic circuit 20 from the high level to the low level.

FIG. 2 is a flowchart illustrating the operation of the integrated circuit 10 according to the first exemplary embodiment. When the voltage Vin is input, the integrated circuit 10 starts the operation. In step S1, the integrated circuit 10 sets the reset signal SG3 at the low level (low state). The integrated circuit 10 maintains the reset signal SG3 at the low level for a specified time T0. After elapse of the specified time T0, in step S2, the integrated circuit 10 inverts the level of the reset signal SG3 to the high level (high state). Subsequently, the integrated circuit 10 continues to hold (maintain) the level of the reset signal SG3 at the high state unless errors are detected. The integrated circuit 10 continues the operation under the high state.

In step S3, the integrated circuit 10 determines whether an error which requires a reset of the logic circuit 20 is present. More specifically, the integrated circuit 10 determines whether an event in which the reset signal SG3 needs to be changed from the high level (high state) to the low level (low state) is present. If the integrated circuit 10 determines such an event is not present (NO in step S3), the process remains in step S3. If the integrated circuit 10 determines such an event is present (YES in step S3), the process proceeds to step S4.

In step S4, the integrated circuit 10 causes the voltage pulse generating circuit 12 to stop outputting the voltage pulse PLS. In step S5, the integrated circuit 10 waits for the specified time T1. In step S6, the integrated circuit 10 changes the level of the reset signal SG3 from the high level to the low level.

Figure 3A:
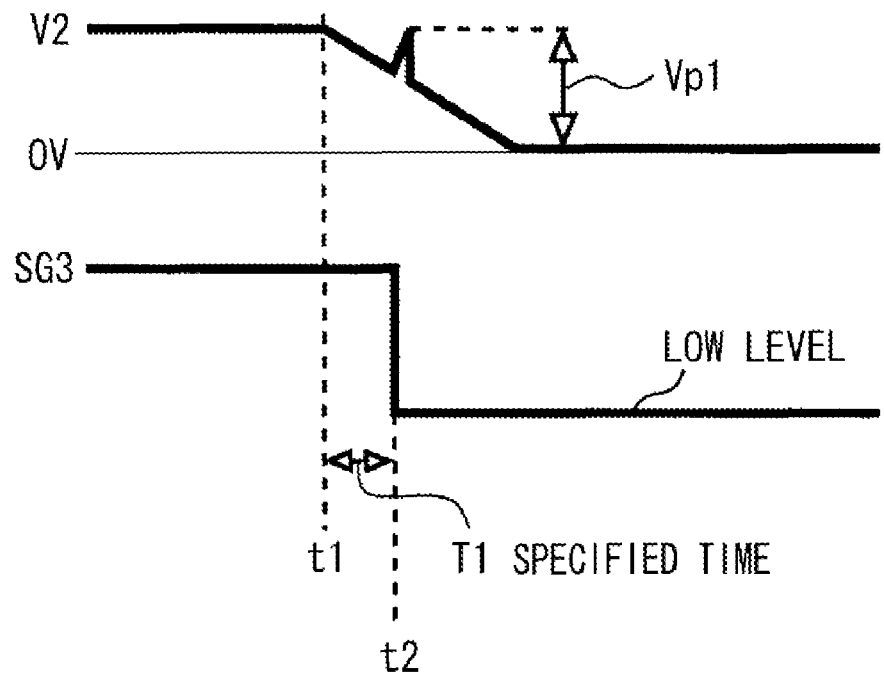
FIGS. 3A and 3B are diagrams illustrating timing waveforms of the operations according to the first exemplary embodiment.
Figure 3B:
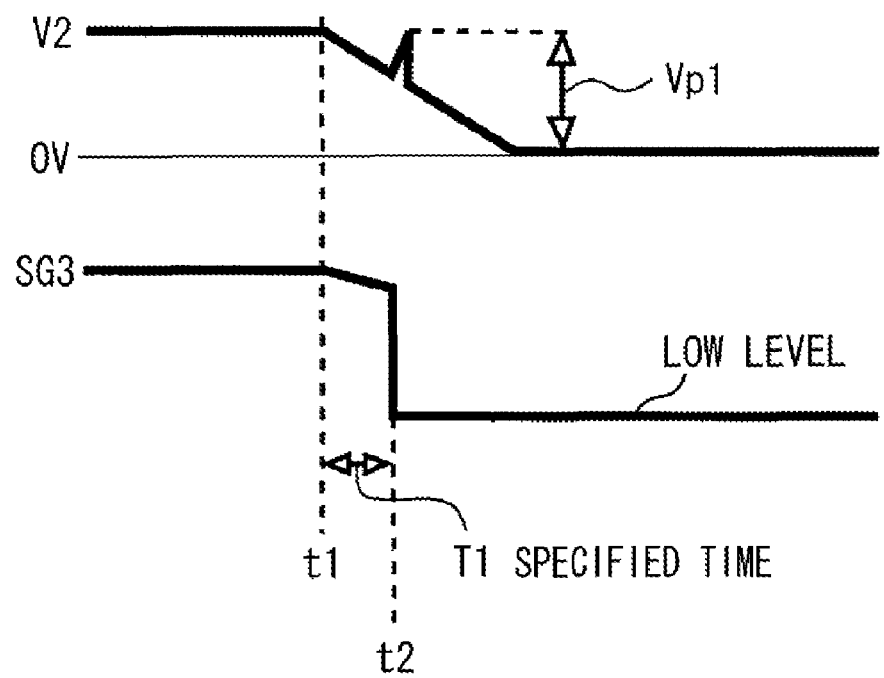

FIGS. 3A and 3B illustrates voltage levels and reset signal SG3 levels according to the first exemplary embodiment. In FIG. 3A, the voltage pulse generating circuit 12 stops outputting of the voltage pulse PLS at a timing t1. At a timing t2 when the time T1 elapses from the timing t1, the reset signal generating circuit 13 switches the reset signal SG3 from the high level to the low level. In FIGS. 3A and 3B, 0V is zero voltage level.

In this case, during a period from the timing t1 when the voltage pulse generating circuit 12 stops the operation to the timing t2 when the reset signal SG3 is output, the level of the voltage V2 supplied to the logic circuit 20 drops. Accordingly, even if a current flowing through the logic circuit 20 rapidly drops and the voltage V2 rises due to the operation of the inductor 31, the level of a peak voltage Vp1 drops. Hence, a peak value Vp1 of the V2 does not exceed the maximum rated voltage of the logic circuit 20.

FIG. 3A illustrates an example in which the voltage level of the reset signal SG3 changes little regardless of a state of the voltage V2. On the other hand, FIG. 3B illustrates a case where a level of the reset signal SG3 gradually drops during the period from the timing t1 to the timing t2. This is because a gradual drop of the voltage V2 causes the high level of the reset signal SG3 to gradually drop.

Second Exemplary Embodiment

Figure 4:
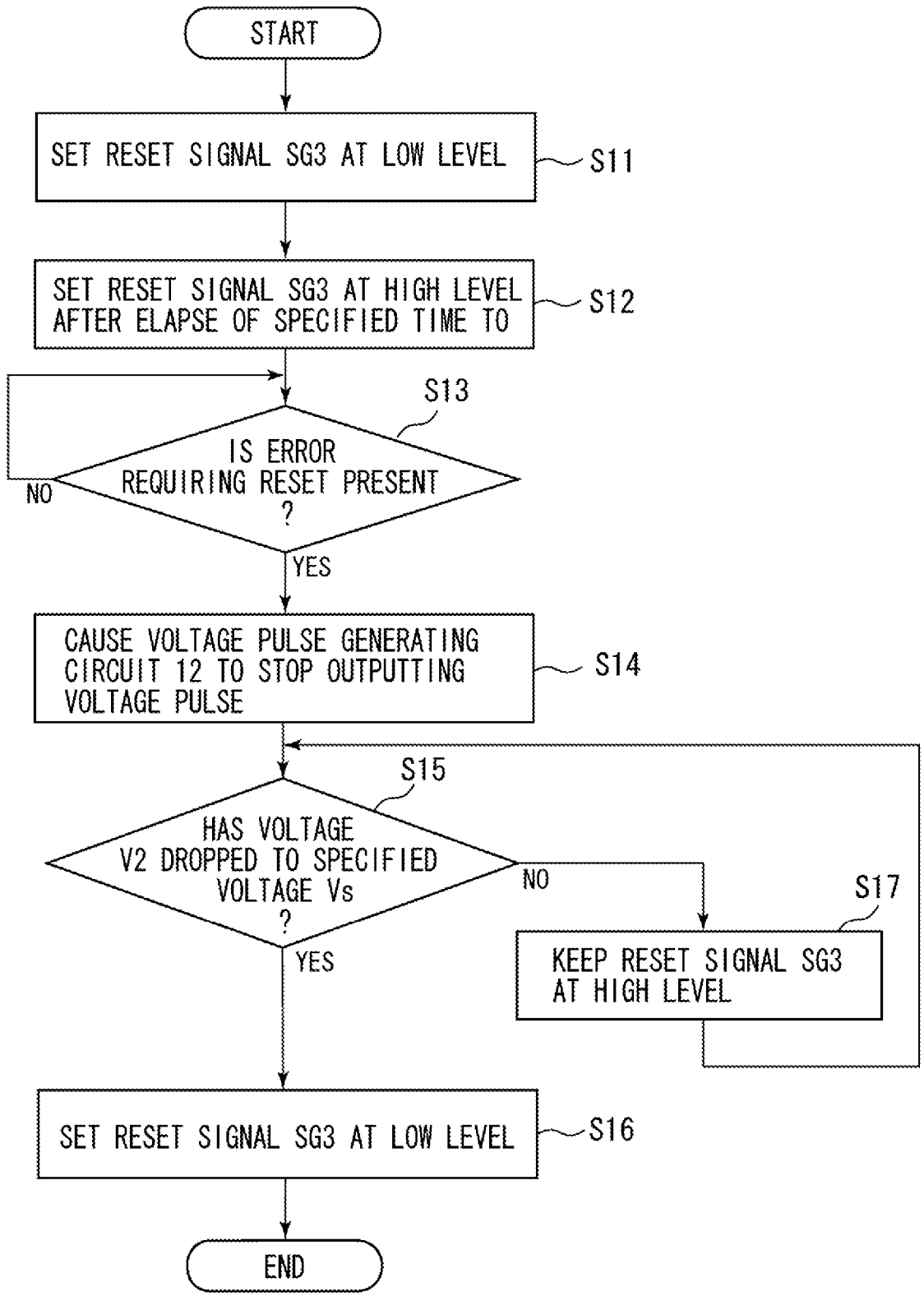
FIG. 4 is a flowchart illustrating an operation of an integrated circuit according to a second exemplary embodiment of the present invention.

A second exemplary embodiment of the present invention is described below. The configuration of the second exemplary embodiment is the same and or similar as that in FIG. 1 and therefore the description thereof will not be repeated. FIG. 4 is a flowchart illustrating the operation of the integrated circuit 10 according to the second exemplary embodiment. The same descriptions as those of the first exemplary embodiment will not be repeated, and only different operation is described below. Steps from S11 to S14 correspond to steps S1 to S4 in FIG. 2, respectively.

In step S15, the voltage pulse generating circuit 12 determines whether the voltage V2 supplied to the logic circuit 20 has dropped to a specified voltage Vs. The voltage V3 is monitored as one example of a method for monitoring the voltage V2. The voltage V3 is obtained by dividing the voltage V2 with resistors R1 and R2. Hence, as the voltage V2 drops, the voltage V3 becomes lower.

When the voltage V2 has not dropped to the specified voltage Vs (NO in step S15), in step S17, the integrated circuit 10 maintains the level of the reset signal SG3 at the high level. On the other hand, when the voltage V2 is detected to have dropped to the specified voltage Vs (YES in step S15), the voltage pulse generating circuit 12 outputs the signal SG2 to the reset signal generating circuit 13. Instep S16, the reset signal generating circuit 13 sets the level of the reset signal SG3 at the low level.

Figure 5A:
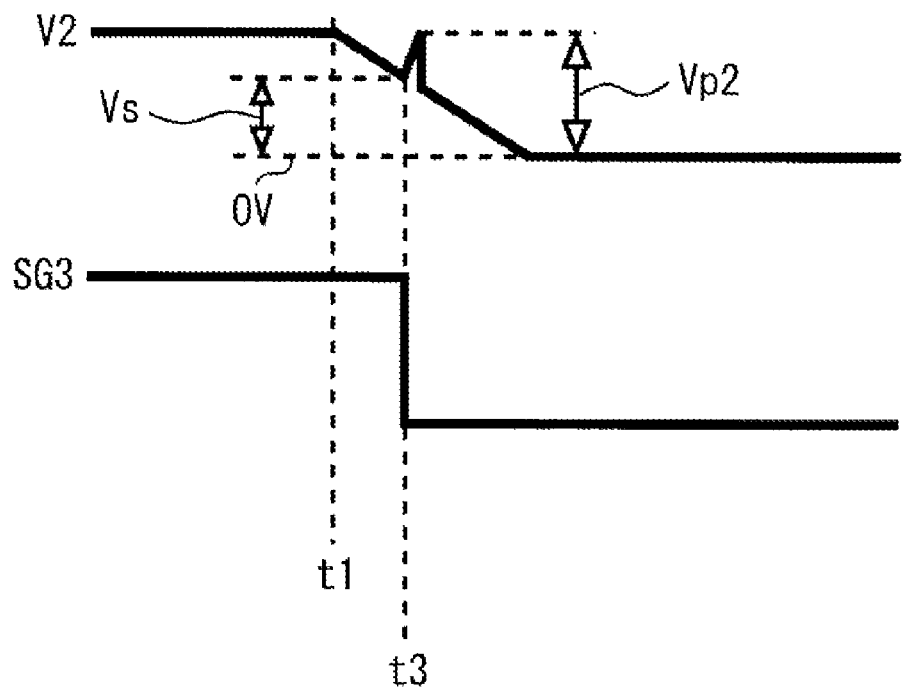
FIGS. 5A and 5B are diagrams illustrating timing waveforms of the operations according to the second exemplary embodiment.
Figure 5B:
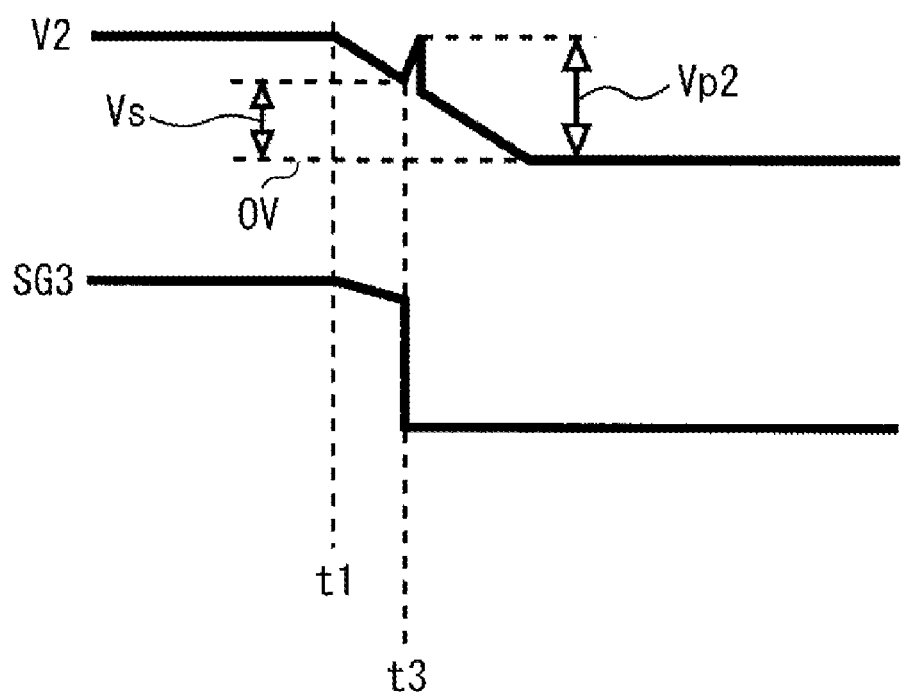

FIGS. 5A and 5B are diagrams illustrating timing waveforms of the operations according to the second exemplary embodiment.

In FIG. 5A, the integrated circuits 10 waits until the voltage V2 becomes the specified voltage Vs after the timing t1 when the voltage pulse generating circuit 12 stops the operation. At a timing t3 when the voltage V2 has dropped to the specified voltage Vs, the reset signal generating circuit 13 sets the level of the reset signal SG3 at the low level.

During the period from the timing t1 to the timing t3, the level of the voltage V2 drops to the previously specified level voltage Vs. By dropping the level of the voltage V2 to the voltage Vs, even if a current flowing through the logic circuit 20 rapidly drops and the voltage V2 rises due to the energy of the inductor 31, a peak value Vp2 during the rising does not exceed the maximum rated voltage of the logic circuit 20.

In an example illustrated in FIG. 5B, the level of the reset signal SG3 gradually drops during the period from the timing t1 to the timing t3. This indicates that a gradual drop of the voltage V2 causes a potential level of the reset signal SG3 in the high state to gradually drop. In FIGS. 5A and 5B, 0V is zero voltage level.

Exemplary Recording Apparatus

Figure 6:
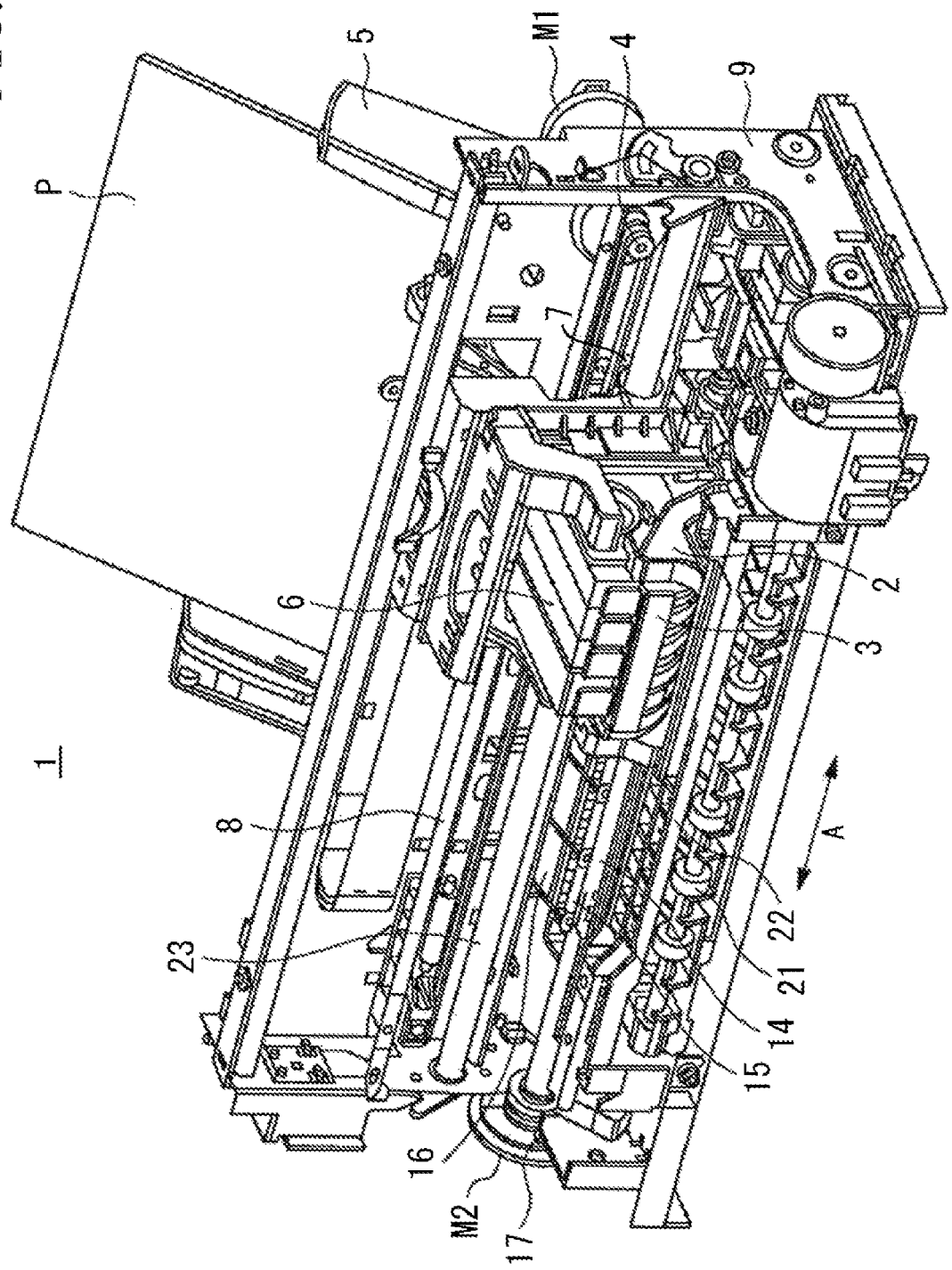
FIG. 6 is a perspective view of an example recording apparatus applied to the exemplary embodiments of the present invention.

FIG. 6 is an external perspective view illustrating a configuration of a recording apparatus 1 applied to the exemplary embodiments described above. As illustrated in FIG. 6, the recording apparatus 1 has a recording head 3 on a carriage 2. The recording head 3 discharges ink for recording according to an ink jet system. A driving force generated by a carriage motor M1 is transmitted to the carriage 2 via a transmission mechanism 4 to reciprocate the carriage 2 in the directions of an arrow A. At the time of recording, for example, a recording medium P such as recording paper is fed and conveyed to a recording position via a paper feed mechanism 5. Recording is performed by discharging ink to the recording medium P from the recording head 3 at the recording position. The recording head 3 scans the recording medium P for recording in this way.

The carriage 2 of the recording apparatus 1 includes an ink cartridge 6 for storing ink to be supplied to the recording head 3 in addition to the recording head 3. The ink cartridge 6 is detachably attached to the carriage 2.

The recording apparatus 1 illustrated in FIG. 6 can perform multiple color recording, and the carriage 2 has four ink cartridges containing four colors of ink: magenta (M), cyan (C), yellow (Y) and black (K), respectively. Each of these four ink cartridges is independently detachable.

The carriage 2 and the recording head 3 properly contact with each other at their own joint faces to ensure and maintain a required electrical connection. By applying energy in response to a recording signal to the recording head 3, ink is selectively discharged from a plurality of discharge ports for recording. In particularly, the recording head 3 uses an ink jet system which discharges ink using thermal energy.

As illustrated in FIG. 6, the carriage 2 is connected to a part of a driving belt 7 of the transmission mechanism 4 for transmitting the driving force of the carriage motor M1 so as to be slidably guided and supported in the directions of the arrow A along a guide shaft 23. Accordingly, the carriage 2 reciprocates along the guide shaft 23 by forward and reverse rotation of the carriage motor M1. A scale 8 for indicating an absolute position of the carriage 2 is provided along reciprocating directions (the directions of the arrow A, scanning directions) of the carriage 2. In this exemplary embodiment, the scale 8 has black bars printed on a transparent polyethylene terephthalate (PET) film at required pitches. One end of the scale 8 is fixed onto a chassis 9 and the other is supported by a plate spring (not illustrated).

The recording apparatus 1 includes a platen (not illustrated) facing a discharge port face on which a discharge port (not illustrated) of the recording head 3 is formed. The carriage 2 mounted with the recording head 3 is reciprocated by the driving force of the carriage motor M1. At the same time, a recording signal is given to the recording head 3 to discharge the ink, thus recording an image over the whole width of the recording medium P which is conveyed to the platen is performed.

Further, in FIG. 6, a conveyance roller 14 is driven by a conveyance motor M2 to convey the recording medium P. A pinch roller 15 brings the recording medium P into contact with the conveyance roller 14 with a spring (not illustrated). A pinch roller holder 16 rotatably supports the pinch roller 15, and a conveyance roller gear 17 is fixed onto one end of the conveyance roller 14. The conveyance roller 14 is driven by rotation of the conveyance motor M2 transmitted to the conveyance roller gear 17 via an intermediate gear (not illustrated).

Furthermore, a discharge roller 21 discharges the recording medium P on which an image is formed by the recording head 3 to the outside of the recording apparatus 1 and is driven by the rotation transmitted from the conveyance motor M2. The discharge roller 21 contacts the recording medium P pressured by a spur roller (not illustrated) which is under pressure of a spring (not illustrated). A spur holder 22 rotatably supports the spur roller.

Figure 7:
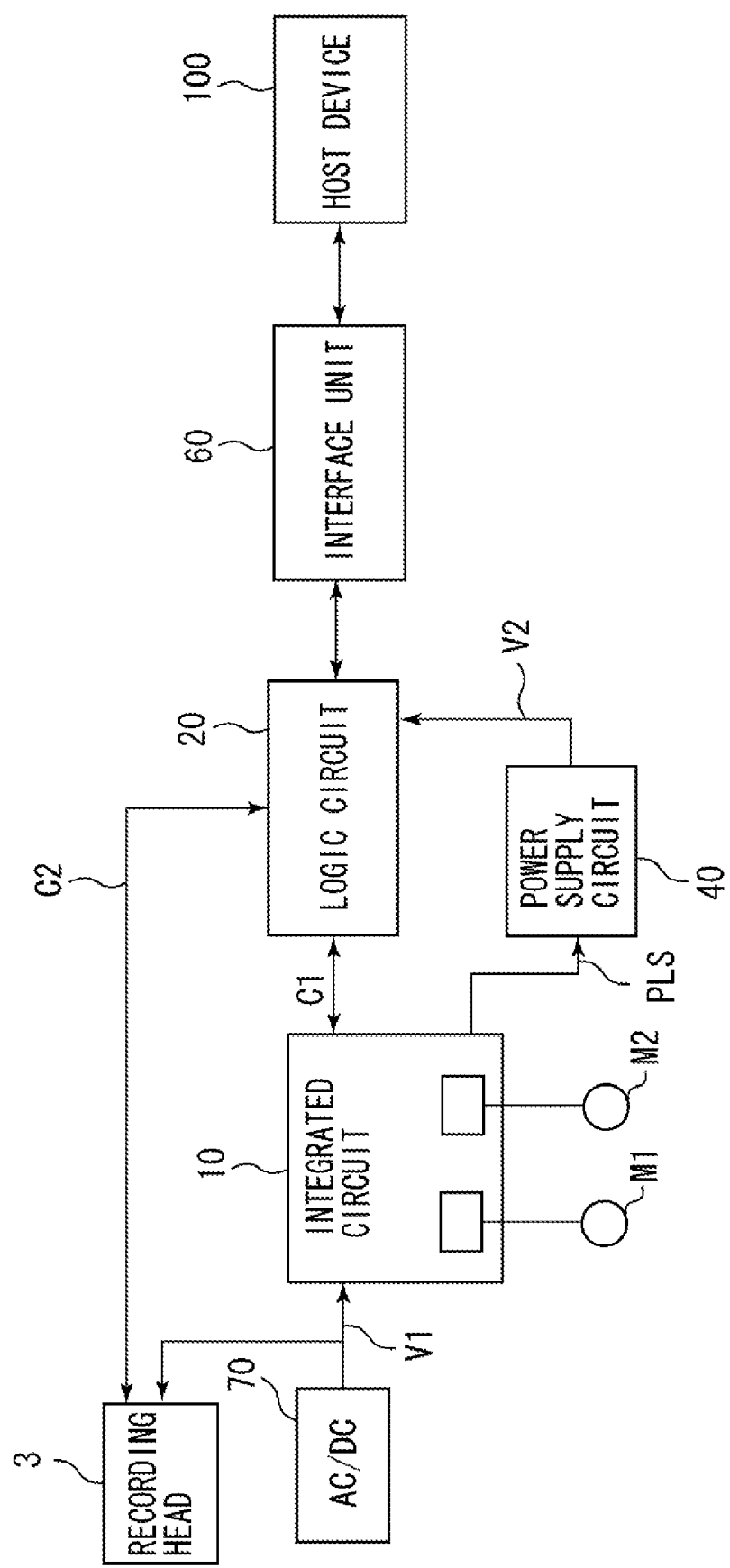
FIG. 7 is a block diagram of the recording apparatus applied to the exemplary embodiments of the present invention.
Figure 8A:
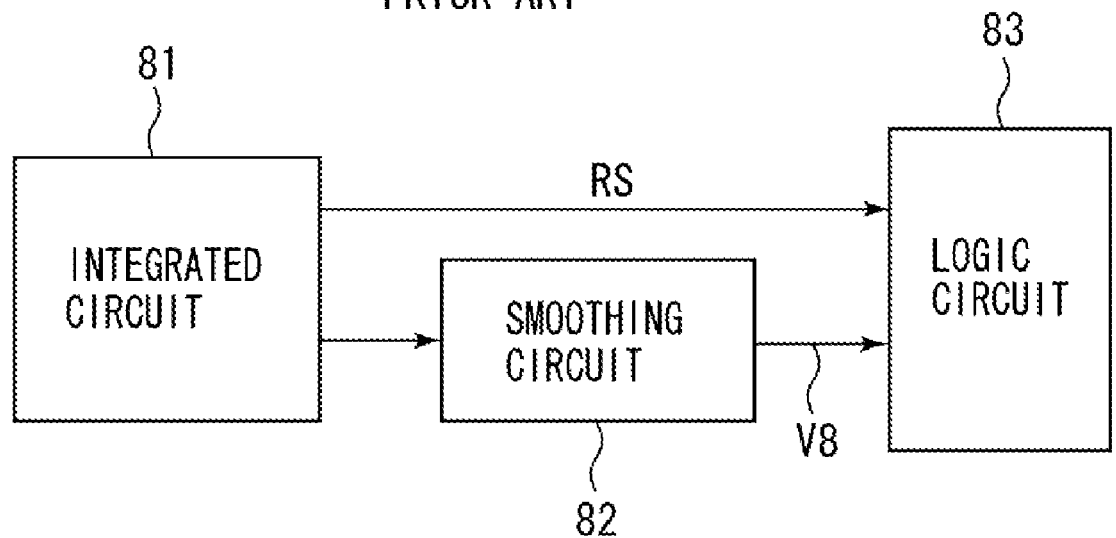
FIGS. 8A and 8B illustrate operational views of a conventional integrated circuit.
Figure 8B:
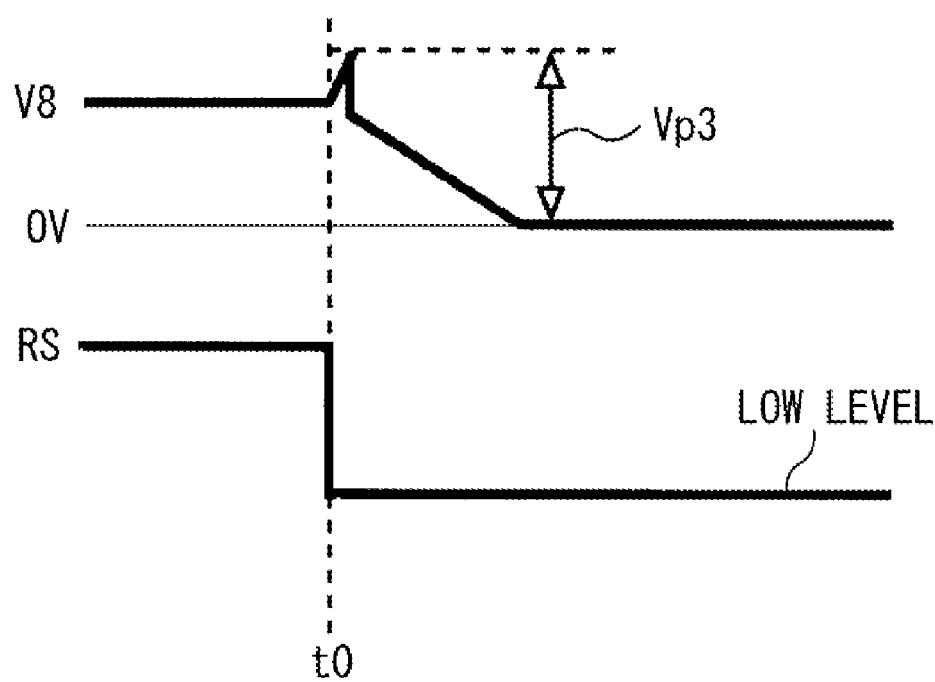

FIG. 7 illustrates a control configuration of the recording apparatus 1. An AC-DC conversion circuit 70 converts an AC voltage into a DC voltage. A voltage V1 generated by the AC-DC conversion circuit 70 is supplied to the recording head 3 and the integrated circuit 10. The voltage V1 (for example, 18 V) corresponds to the voltage Vin in FIG. 1. The integrated circuit 10 includes a driving circuit for driving the carriage motor M1 and a driving circuit for driving the conveyance motor M2 illustrated in FIG. 6.

The integrated circuit 10 communicates with the logic circuit 20 illustrated in FIG. 1 via a control bus C1. The reset signal SG3 illustrated in FIG. 1 is also included in the control bus C1.

The logic circuit 20 communicates with the recording head 3 via a control bus C2. The logic circuit 20 includes a CPU, an ASIC, a random access memory (RAM) and a read only memory (ROM). The CPU executes control of the recording apparatus with the RAM according to a program stored in the ROM. The RAM includes a receive buffer and a record buffer.

As illustrated in FIG. 1, the voltage V2 generated in the power supply circuit 40 is supplied to the logic circuit 20.

Via an interface unit 60, a control command and image data are input from a host device 100. The CPU and ASIC generate record data from the image data and the control command. The recording apparatus performs recording for the recording medium P according to the record data.

Another Exemplary Embodiment

In addition to the above-described exemplary embodiments, the following configuration may be used. For example, the integrated circuit 10 may include a temperature sensor and a temperature monitoring circuit for monitoring temperatures of the temperature sensor. The temperature monitoring circuit may include a configuration to transmit a failure detection signal to the voltage pulse generating circuit 12 and the reset signal generating circuit 13 when the temperature exceeds a predetermined reference temperature.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-207045 filed Aug. 8, 2007, which is hereby incorporated by reference herein in its entirety.

What is claimed is:

1. An integrated circuit comprising:
    a trigger signal generating unit configured to generate a trigger signal for setting a control unit connected thereto in a reset state;
    an input unit configured to input a DC voltage of a predetermined voltage value;
    a pulse signal generating unit configured to generate and output a pulse signal with the predetermined voltage value to a power supply unit configured to generate a voltage to be supplied to the control unit with a coil and a capacitor;
    a detecting unit configured to detect generation of an event which requires an output of the trigger signal;
    a stopping unit configured to stop outputting of the pulse signal based on a detection result from the detecting unit; and
    an output unit configured to output the trigger signal generated by the trigger signal generating unit after outputting of the pulse signal is stopped and a predetermined condition is satisfied.

2. The integrated circuit according to claim 1, wherein the event is a case where a voltage value input by the input unit or a voltage value generated by the power supply unit is deviated from respectively predetermined voltage ranges thereof.

3. The integrated circuit according to claim 1, wherein the predetermined condition is that a certain time lapses after stopping outputting of the pulse signal.

4. The integrated circuit according to claim 1, wherein the predetermined condition is that a voltage value generated by the power supply unit drops to a predetermined value.

5. An electronic apparatus comprising:
    a control circuit configured to control an operation of the electronic apparatus;
    a power supply circuit configured to output a voltage having a pulse signal smoothed with a coil and a capacitor to the control circuit;
    a pulse generating circuit configured to generate a pulse signal of a duty based on the voltage output by the power supply circuit;
    a trigger generating circuit configured to generate a trigger signal for setting the control circuit in a reset state; and
    a detecting circuit configured to detect generation of an event which requires an output of the trigger signal,
    wherein the pulse generating circuit stops outputting of the pulse signal based on detection by the detecting circuit, and then the trigger generating circuit waits to output the trigger signal until a predetermined condition is satisfied.

6. The electronic apparatus according to claim 5, wherein the pulse generating circuit, the trigger generating circuit and the detecting circuit are included in a one-chip integrated circuit.

* * * * *